United States Patent
Jain et al.

(10) Patent No.: US 11,516,184 B2
(45) Date of Patent: Nov. 29, 2022

(54) FIREWALL SERVICE INSERTION ACROSS SECURE FABRIC PRESERVING SECURITY GROUP TAGS END TO END WITH DUAL HOMED FIREWALL

(71) Applicant: Cisco Technology, Inc., San Jose, CA (US)

(72) Inventors: Prakash C. Jain, Fremont, CA (US); Sanjay Kumar Hooda, Pleasanton, CA (US); Satish Kondalam, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 253 days.

(21) Appl. No.: 16/561,360

(22) Filed: Sep. 5, 2019

(65) Prior Publication Data

US 2021/0075767 A1    Mar. 11, 2021

(51) Int. Cl.
| | |
|---|---|
| *H04L 9/40* | (2022.01) |
| *H04L 61/25* | (2022.01) |
| *H04L 45/02* | (2022.01) |
| *H04W 76/22* | (2018.01) |
| *G06F 21/50* | (2013.01) |
| *H04W 36/00* | (2009.01) |
| *H04W 36/14* | (2009.01) |

(52) U.S. Cl.
CPC .......... *H04L 63/0272* (2013.01); *G06F 21/50* (2013.01); *H04L 45/04* (2013.01); *H04L 61/25* (2013.01); *H04L 63/0245* (2013.01); *H04L 63/0254* (2013.01); *H04L 63/0263* (2013.01); *H04L 63/0428* (2013.01); *H04W 36/0044* (2013.01); *H04W 36/14* (2013.01); *H04W 76/22* (2018.02); *H04W 36/0038* (2013.01); *H04W 36/0069* (2018.08)

(58) Field of Classification Search
CPC . G06F 21/50; H04L 63/0263; H04L 63/0254; H04L 63/0272; H04W 76/22; H04W 36/0044; H04W 36/14; H04W 36/0069; H04W 36/0038
See application file for complete search history.

(56) References Cited

U.S. PATENT DOCUMENTS

| | | | |
|---|---|---|---|
| 8,295,168 B2 | 10/2012 | Gai et al. | |
| 8,607,301 B2 | 12/2013 | Carrasco | |
| 9,019,837 B2 | 4/2015 | Lue et al. | |
| 10,333,897 B2 | 6/2019 | Arramreddy et al. | |

(Continued)

*Primary Examiner* — Kyung H Shin
(74) *Attorney, Agent, or Firm* — Polsinelli

(57) ABSTRACT

Systems, methods, and computer-readable media for preserving source host context when firewall policies are applied to traffic in an enterprise network fabric. A data packet to a destination host from a source host can be received at a first border node instance in an enterprise network fabric as part of network traffic. The data packet can include a context associated with the source host. Further, the data packet can be sent to a firewall of the enterprise network fabric and can be received at a second border node instance after the firewall applies a firewall policy to the data packet. The data packet can then be selectively encapsulated with the context associated with the source host at the second border node instance for applying one or more policies to control transmission of the network traffic through the enterprise network fabric.

20 Claims, 10 Drawing Sheets

(56) References Cited

U.S. PATENT DOCUMENTS

2017/0104720 A1    4/2017  Nicira
2018/0183759 A1*  6/2018  Gunda ................ H04L 63/0272
2021/0014749 A1*  1/2021  Liu ....................... H04W 76/22

* cited by examiner

FIG. 6A (602) Request for IP-SGT bindings
(604) IP-SGT bindings
(606) Config across VRF policy IID1 (prefix in VRF1 with SGT <-> IID2 (prefix in VRF2 with SGT) Config site with fabric prefixes
(608) Inject routes into IID1 to attract all unicast traffic of IID2 prefixes
(610) Publish incomplete map-cache for all ID2 prefixes in IID2, to generate map-requested per src-dst prefix pair
(612) Inject routes into IID2 to attract all unicast traffic of IID1 prefixes
(614) Publish incomplete map-cache for all ID1 prefixes in IID1, to generate map-requested per src-dst prefix pair
(616) ARP/DHCP
(618) Map-register H1/xTR1 in VRF1 (Optional carry SGT)
(620) ARP/DHCP
(622) Map-register H2/xTR2 in VRF2 (Optional carry SGT)
(624) Incoming unicast pkt to xTR1 src H1, IID1, dest H2
(626) Map request for H2 in IID1, src H1
(628) Map reply with RLOCs as Border, IID1 & SGT1 (found using src H1)
(630) Encapsulate pkt with IID1 & SGT1 and send to Border
(632) Incoming pkt from Border src H1, IID1, dest H2
[A] H1 host detected at VRF1
[B] H1 prefix added in IID1's inter VRF policy (with SGT if added dynamically)
[C] H2 host detected at VRF2
[D] H2 prefix added in IID2's inter VRF policy (with SGT if added dynamically)

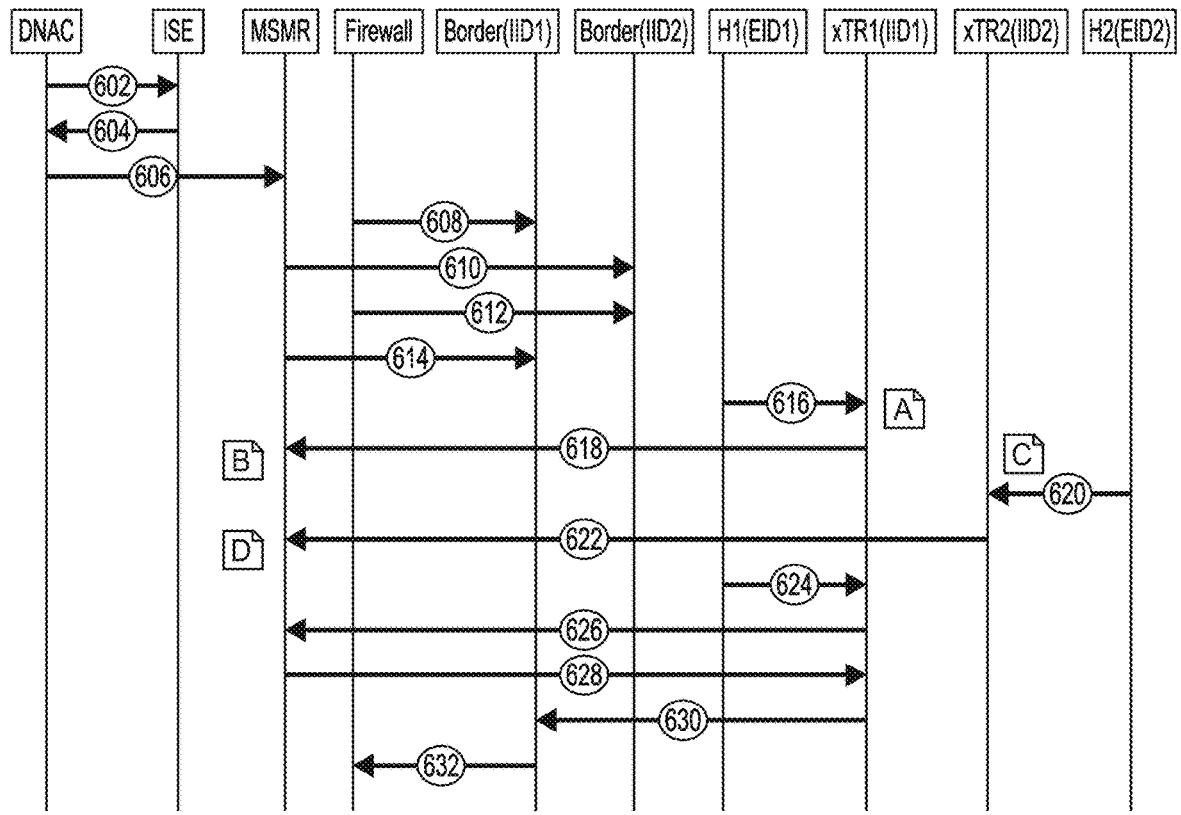

FIG. 6B

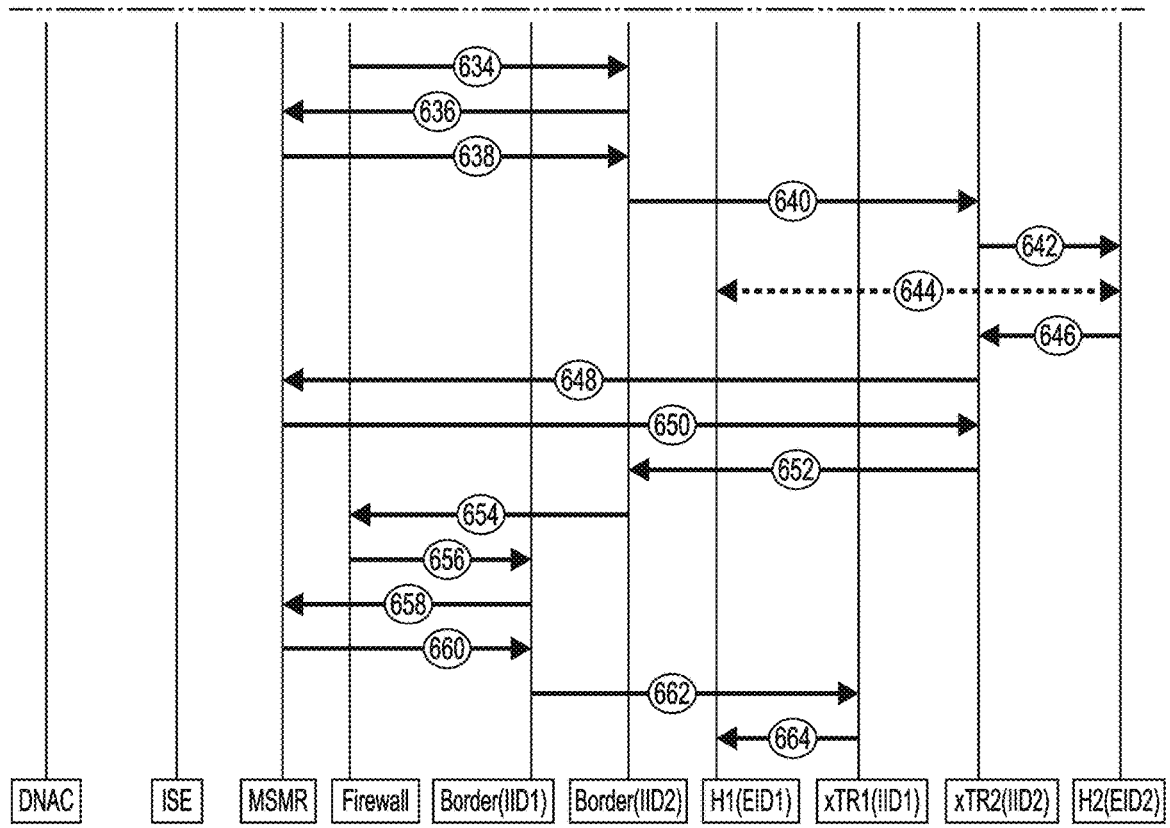

634 After applying FW policy Firewall routes pkt into IID2 on Border src H1, dest H2
636 Map request for H2 in IID2, SRC H1 (triggered when no map-cache exists for H1->H2 pair in IID2
638 Map reply with RLOCs as xTR2 IID2 & SGT1 (based on src H1)
640 Encapsulate pkt with IID2+SGT1 and send to xTRX
642 Apply SGACL, Decapsulate pkt and send to dest H2
644 Reverse packet flow
646 Incoming unicast pkt to xTR2 src H2, IID2, dest H1
648 Map request for H1 in IID2 + SGT2
650 Map reply with RLOCs as Border, IID2 & SGT2
652 Encapsulate pkt with IID2_SGT2 and send to Border
654 Incoming unicast pkt from Border src H2, IID2, dest H1
656 After applying policy Firewall routes pkt into IID1 on Border src H1, dest H2
658 Map request for H1 in IID1, SRC H2
660 Map reply with RLOCs as xTR1, IID1 & SGT2
662 Encapsulate pkt with IID1+SGT2 and send to xTR1
664 Apply SGACL, Decapsulate pkt and send to dest H1

FIREWALL SERVICE INSERTION ACROSS SECURE FABRIC PRESERVING SECURITY GROUP TAGS END TO END WITH DUAL HOMED FIREWALL

TECHNICAL FIELD

The present technology pertains to preserving source host context when firewall policies are applied to traffic in an enterprise network fabric, and in particular to preserving the source host context after application of firewall policies in order to enforce policies in the enterprise network fabric.

BACKGROUND

Currently, enterprise network fabrics allow cross-node, e.g. virtual node (VN), communication between virtual routing and forwarding instances (VRFs) and VNs while keeping secured policy based isolation between the VRFs/VNs. In many deployments these cross-VRF communications pass through a firewall or other applicable service insertion application. Further, current enterprise fabrics use contexts associated with source VNs and destination VNs, e.g. security group tags (SGTs) to enforce policy. However, firewalls typically strip data packets of source host contexts making it difficult to enforce policies in enterprise network fabrics using the source host contexts. This becomes even more difficult when network environments are connected to an enterprise network fabric, e.g. in a multi-site enterprise network fabric, through dual homed borders with redundancy/load balancing. There therefore exist needs for systems and methods for preserving source host context of traffic in an enterprise network fabric when firewall security policies are applied to the traffic. In particular, there exist needs for systems and methods for preserving source host context to apply policies to traffic in an enterprise network fabric when firewall security policies are also applied to the traffic. Further, there exist needs for systems and methods for preserving source host context in traffic between two authorized subscribers in different VNs through an enterprise network fabric when firewall security policies are applied to the traffic.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 6A and 6B show an example timing diagram for an example method of preserving source context information in traffic passing through an enterprise network when a firewall is applied to the traffic;

DESCRIPTION OF EXAMPLE EMBODIMENTS

Figure 1A:
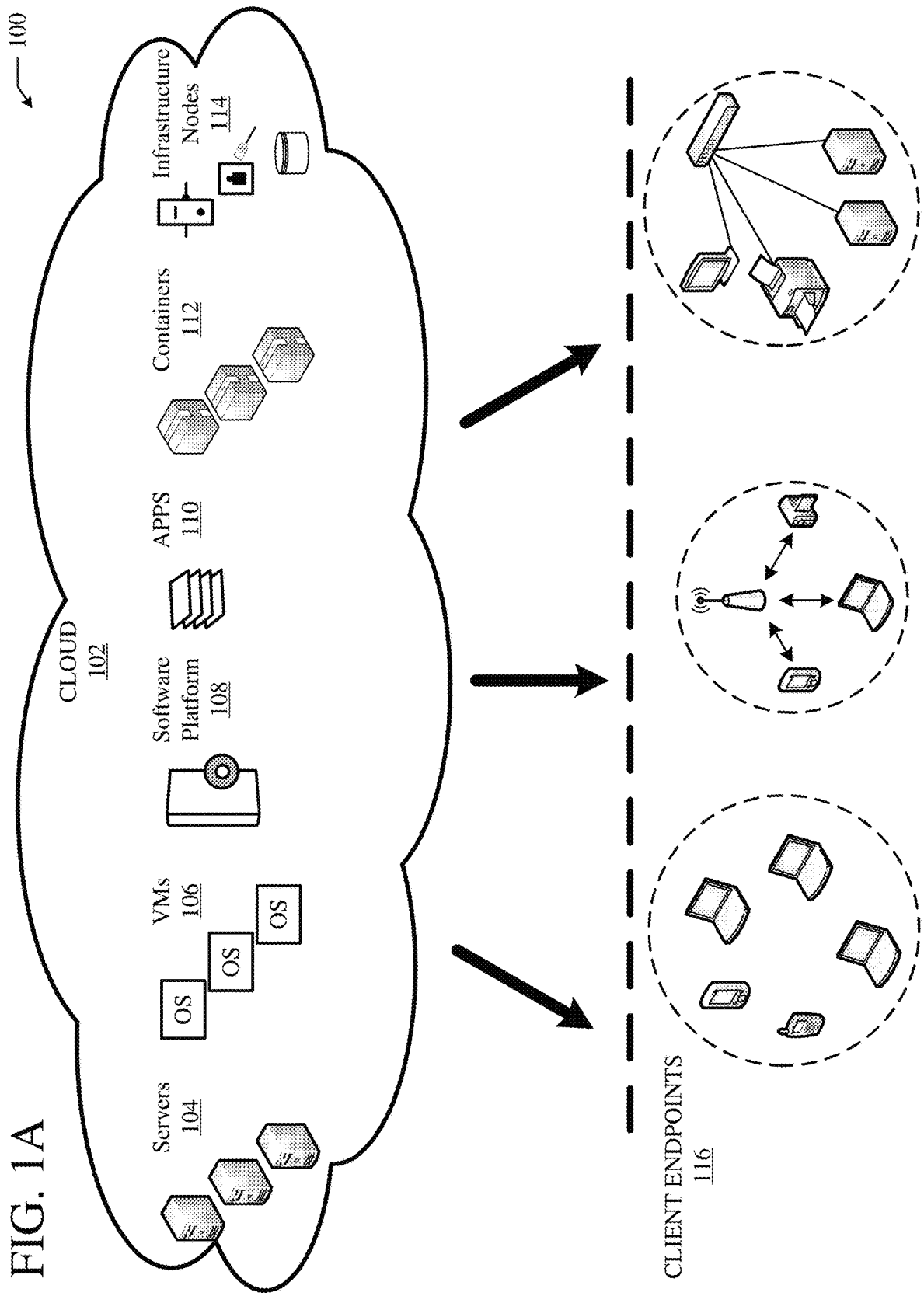
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include receiving a data packet as part of network traffic to a destination host from a source host at a first border node instance in an enterprise network fabric. The data packet can be received with a context associated with the source host. The data packet can be sent to a firewall of the enterprise network fabric. The data packet can be received at a second border node instance after the firewall applies a firewall policy to the data packet. The data packet can then be selectively encapsulated at the second border node instance with a context associated with the source host for applying one or more policies to control transmission of the network traffic through the enterprise network fabric.

A system can include one or more processors and at least one computer-readable storage medium storing instructions which, when executed by the one or more processors, cause the one or more processors to receive a data packet as part of network traffic to a destination host from a source host at a first border node instance in an enterprise network fabric. The data packet can be received with a context associated with the source host. The instructions can also cause the one or more processors to send the data packet to a firewall of the enterprise network fabric. Further, the instructions can cause the one or more processors to receive the data packet at a second border node instance after the firewall applies a firewall policy to the data packet. Additionally, the instructions can cause the one or more processors to selectively encapsulate the data packet with a security group tag associated with the source host at the second border node instance for applying one or more policies to control transmission of the network traffic through the enterprise network fabric.

A non-transitory computer-readable storage medium having stored therein instructions which, when executed by a processor, cause the processor to receive a data packet as part of network traffic to a destination host from a source host at a first border node instance in an enterprise network fabric. The data packet can be received with a context associated with the source host. The instructions can also cause the processor to inject, into the first border node instance, routes from source nodes associated with the first border node instance to a firewall of the enterprise network fabric. Further, the instructions can cause the processor to send the data packet to the firewall based on the routes injected into the first border node instance. Additionally, the instructions can cause the processor to receive the data packet at the second border node instance after the firewall applies a firewall policy to the data packet. The instructions can also cause the processor to selectively encapsulate the data packet with a context associated with the source host at the second border node instance for applying one or more policies to control transmission of the network traffic through the enterprise network fabric.

Example Embodiments

The disclosed technology addresses the need in the art for preserving source host context when firewall policies are applied to traffic in an enterprise network fabric. Further, the disclosed technology addresses the needs in the art for preserving source host context in traffic between two authorized subscribers in different VNs through an enterprise network fabric when firewall security policies are applied to the traffic. The present technology involves system, methods, and computer-readable media for preserving a source host context of traffic when firewall security policies are applied to the traffic.

Figure 7:
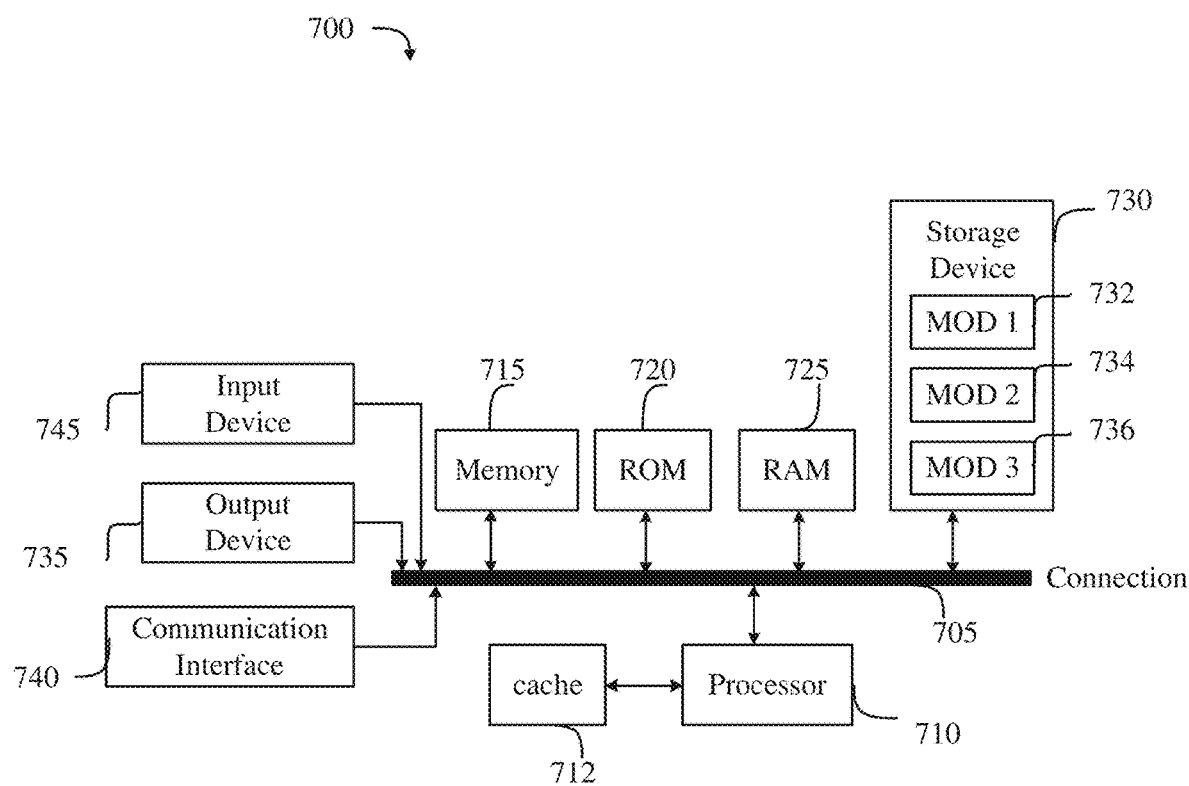
FIG. 7 illustrates an example computing system.
Figure 8:
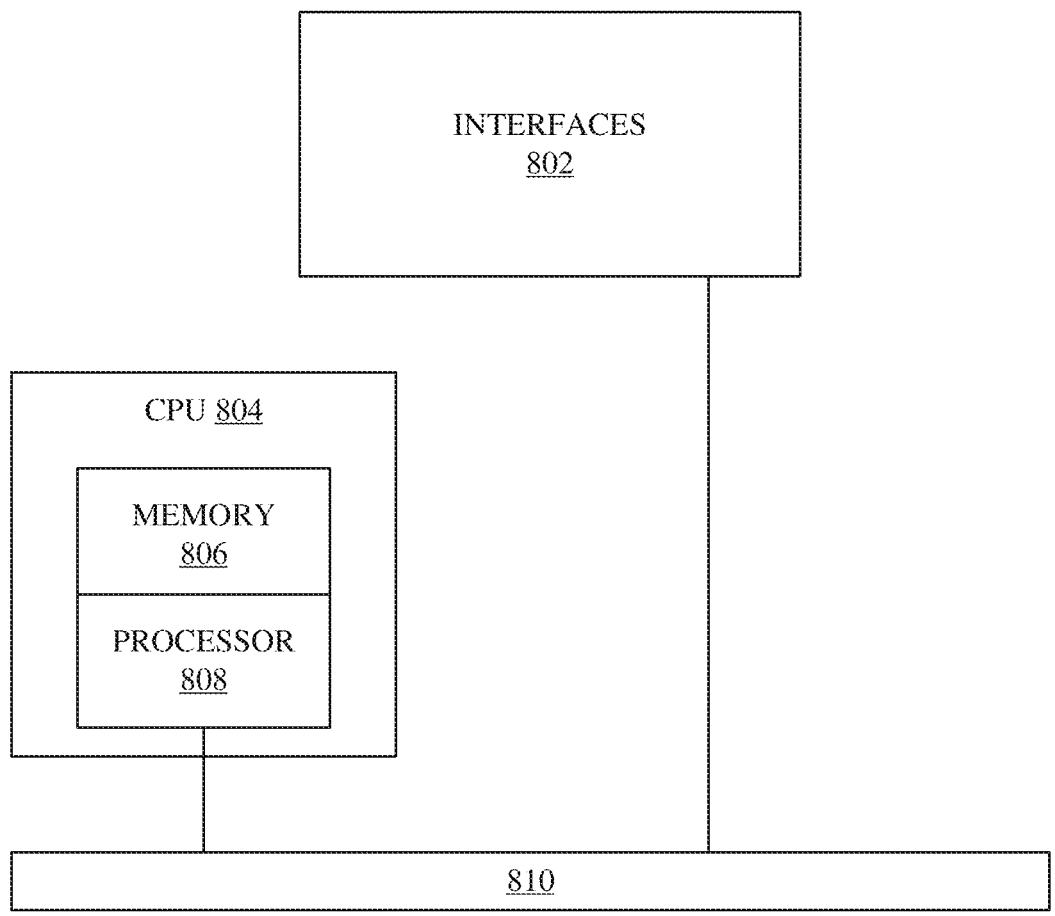
FIG. 8 illustrates an example network device.

A description of network environments and architectures for network data access and services, as illustrated in FIGS. 1-4 is first disclosed herein. A discussion of systems, methods, and computer-readable media for preserving source host context in traffic when firewall security policies are applied to the traffic, as shown in FIGS. 5, 6A, and 6B, will then follow. The discussion then concludes with a brief description of example devices, as illustrated in FIGS. 7 and 8. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1B:
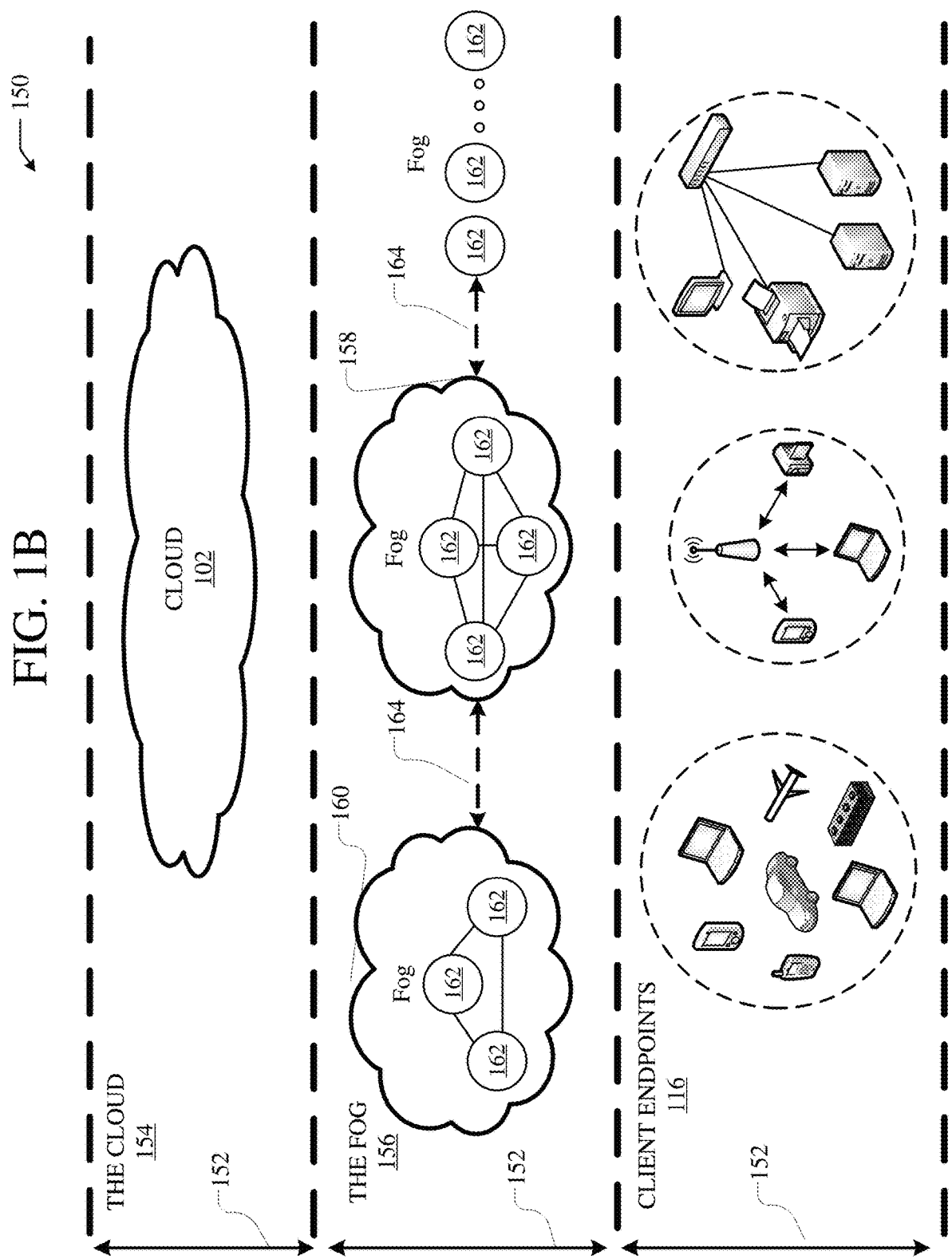
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographical locations, logical locations or networks, and/or fog instances while maintaining connectivity with the cloud layer 154 and/or the endpoints 116. For example, a particular fog node can be placed in a vehicle, such as an aircraft or train, which can travel from one geographical location and/or logical location to a different geographical location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2:
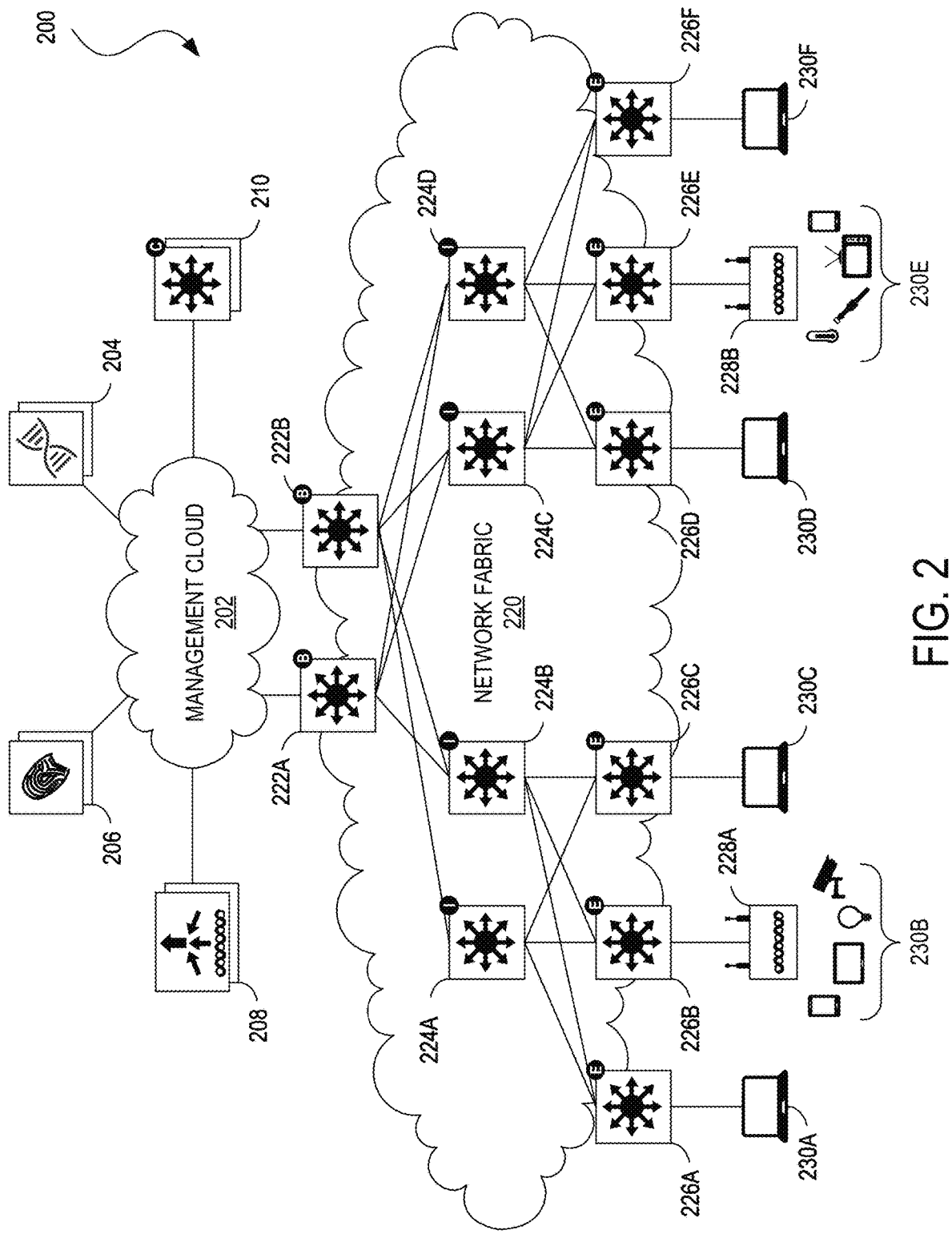
FIG. 2 illustrates an example of a physical topology of an enterprise network for providing intent-based networking.

FIG. 2 illustrates an example of a physical topology of an enterprise network 200 for providing intent-based networking. It should be understood that, for the enterprise network 200 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 200 can include any number or type of resources, which can be accessed and utilized by endpoints or network devices. The illustrations and examples provided herein are for clarity and simplicity.

In this example, the enterprise network 200 includes a management cloud 202 and a network fabric 220. Although shown as an external network or cloud to the network fabric 220 in this example, the management cloud 202 may alternatively or additionally reside on the premises of an organization or in a colocation center (in addition to being hosted by a cloud provider or similar environment). The management cloud 202 can provide a central management plane for building and operating the network fabric 220. The management cloud 202 can be responsible for forwarding configuration and policy distribution, as well as device management and analytics. The management cloud 202 can comprise one or more network controller appliances 204, one or more authentication, authorization, and accounting (AAA) appliances 206, one or more wireless local area network controllers (WLCs) 208, and one or more fabric control plane nodes 210. In other embodiments, one or more elements of the management cloud 202 may be co-located with the network fabric 220.

The network controller appliance(s) 204 can function as the command and control system for one or more network fabrics, and can house automated workflows for deploying and managing the network fabric(s). The network controller appliance(s) 204 can include automation, design, policy, provisioning, and assurance capabilities, among others, as discussed further below with respect to FIG. 3. In some embodiments, one or more Cisco Digital Network Architecture (Cisco DNA™) appliances can operate as the network controller appliance(s) 204.

The AAA appliance(s) 206 can control access to computing resources, facilitate enforcement of network policies, audit usage, and provide information necessary to bill for services. The AAA appliance can interact with the network controller appliance(s) 204 and with databases and directories containing information for users, devices, things, policies, billing, and similar information to provide authentication, authorization, and accounting services. In some embodiments, the AAA appliance(s) 206 can utilize Remote Authentication Dial-In User Service (RADIUS) or Diameter to communicate with devices and applications. In some embodiments, one or more Cisco® Identity Services Engine (ISE) appliances can operate as the AAA appliance(s) 206.

The WLC(s) 208 can support fabric-enabled access points attached to the network fabric 220, handling traditional tasks associated with a WLC as well as interactions with the fabric control plane for wireless endpoint registration and roaming. In some embodiments, the network fabric 220 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 208.

The network fabric 220 can comprise fabric border nodes 222A and 222B (collectively, 222), fabric intermediate nodes 224A-D (collectively, 224), and fabric edge nodes 226A-F (collectively, 226). Although the fabric control plane node(s) 210 are shown to be external to the network fabric 220 in this example, in other embodiments, the fabric control plane node(s) 210 may be co-located with the network fabric 220. In embodiments where the fabric control plane node(s) 210 are co-located with the network fabric 220, the fabric control plane node(s) 210 may comprise a dedicated node or set of nodes or the functionality of the fabric control node(s) 210 may be implemented by the fabric border nodes 222.

The fabric control plane node(s) 210 can serve as a central database for tracking all users, devices, and things as they attach to the network fabric 220, and as they roam around. The fabric control plane node(s) 210 can allow network infrastructure (e.g., switches, routers, WLCs, etc.) to query the database to determine the locations of users, devices, and things attached to the fabric instead of using a flood and learn mechanism. In this manner, the fabric control plane node(s) 210 can operate as a single source of truth about where every endpoint attached to the network fabric 220 is located at any point in time. In addition to tracking specific endpoints (e.g., /32 address for IPv4, /128 address for IPv6, etc.), the fabric control plane node(s) 210 can also track larger summarized routers (e.g., IP/mask). This flexibility can help in summarization across fabric sites and improve overall scalability.

The fabric border nodes 222 can connect the network fabric 220 to traditional Layer 3 networks (e.g., non-fabric networks) or to different fabric sites. The fabric border nodes 222 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 222 can also exchange reachability and policy information with fabric control plane nodes of different fabric sites. The fabric border nodes 222 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 224 can operate as pure Layer 3 forwarders that connect the fabric border nodes 222 to the fabric edge nodes 226 and provide the Layer 3 underlay for fabric overlay traffic.

The fabric edge nodes 226 can connect endpoints to the network fabric 220 and can encapsulate/decapsulate and forward traffic from these endpoints to and from the network fabric. The fabric edge nodes 226 may operate at the perimeter of the network fabric 220 and can be the first points for attachment of users, devices, and things and the implementation of policy. In some embodiments, the network fabric 220 can also include fabric extended nodes (not shown) for attaching downstream non-fabric Layer 2 network devices to the network fabric 220 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 226 for communication to outside subnets.

In this example, the network fabric can represent a single fabric site deployment which can be differentiated from a multi-site fabric deployment as discussed further below with respect to FIG. 4.

In some embodiments, all subnets hosted in a fabric site can be provisioned across every fabric edge node 226 in that fabric site. For example, if the subnet 10.10.10.0/24 is provisioned in a given fabric site, this subnet may be defined across all of the fabric edge nodes 226 in that fabric site, and endpoints located in that subnet can be placed on any fabric edge node 226 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 222, 224, and 226.

The enterprise network 200 can also include wired endpoints 230A, 230C, 230D, and 230F and wireless endpoints 230B and 230E (collectively, 230). The wired endpoints 230A, 230C, 230D, and 230F can connect by wire to fabric edge nodes 226A, 226C, 226D, and 226F, respectively, and the wireless endpoints 230B and 230E can connect wirelessly to wireless access points 228B and 228E (collectively, 228), respectively, which in turn can connect by wire to fabric edge nodes 226B and 226E, respectively. In some embodiments, Cisco Aironet® access points, Cisco Meraki® MR access points, and/or other Cisco DNA™-ready access points can operate as the wireless access points 228.

The endpoints 230 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 230 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 220 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 208 notifying the fabric control plane node(s) 210 of joins, roams, and disconnects by the wireless endpoints 230 such that the fabric control plane node(s) can have connectivity information about both wired and wireless endpoints in the network fabric 220, and can serve as the single source of truth for endpoints connected to the network fabric. For data plane integration, the WLC(s) 208 can instruct the fabric wireless access points 228 to form a VXLAN overlay tunnel to their adjacent fabric edge nodes 226. The AP VXLAN tunnel can carry segmentation and policy information to and from the fabric edge nodes 226, allowing connectivity and functionality identical or similar to that of a wired endpoint. When the wireless endpoints 230 join the network fabric 220 via the fabric wireless access points 228, the WLC(s) 208 can onboard the endpoints into the network fabric 220 and inform the fabric control plane node(s) 210 of the endpoints' Media Access Control (MAC) addresses. The WLC(s) 208 can then instruct the fabric wireless access points 228 to form VXLAN overlay tunnels to the adjacent fabric edge nodes 226. Next, the wireless endpoints 230 can obtain IP addresses for themselves via Dynamic Host Configuration Protocol (DHCP). Once that completes, the fabric edge nodes 226 can register the IP addresses of the wireless endpoint 230 to the fabric control plane node(s) 210 to form a mapping between the endpoints' MAC and IP addresses, and traffic to and from the wireless endpoints 230 can begin to flow.

Figure 3:
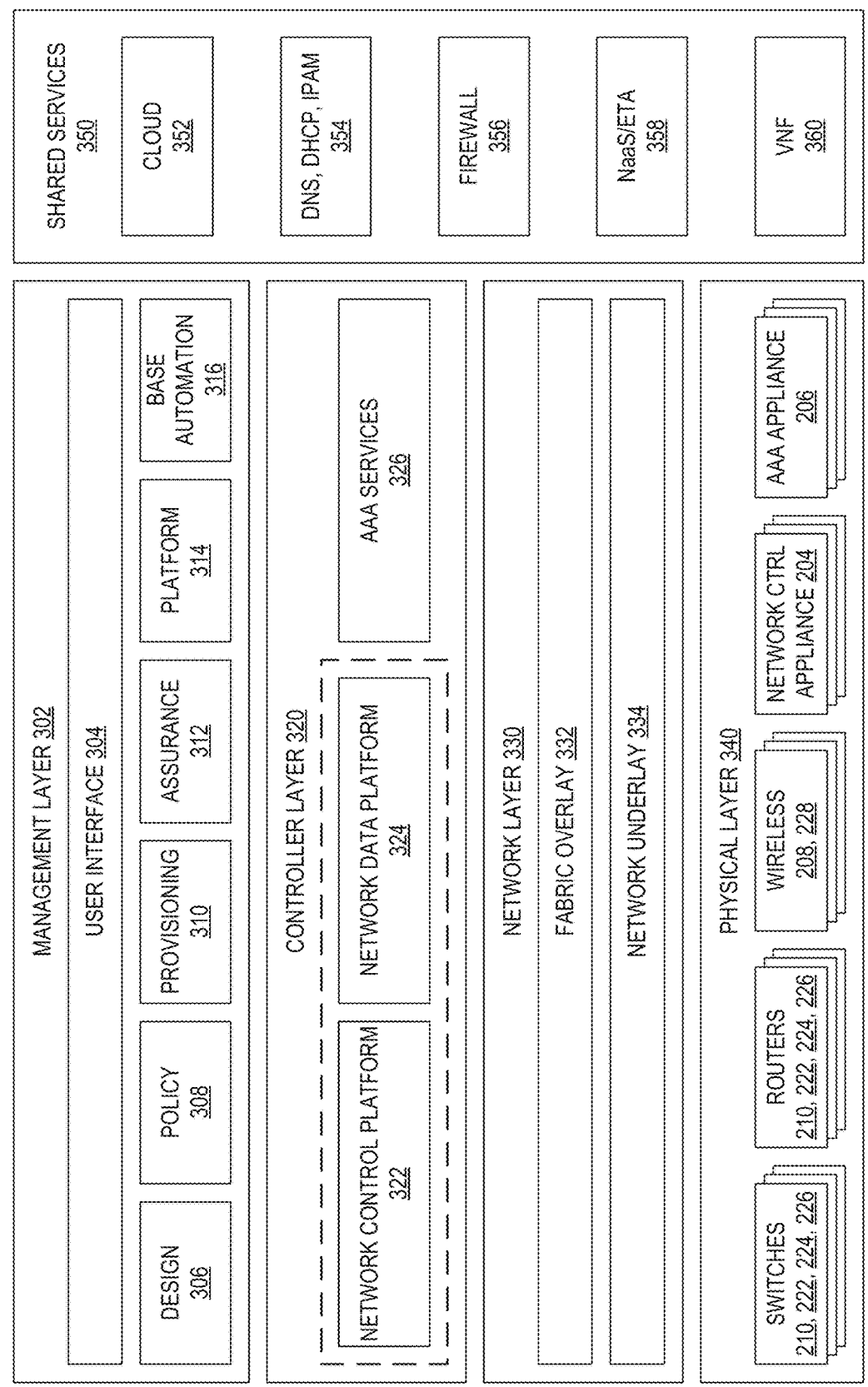
FIG. 3 illustrates an example of a logical architecture for an enterprise network.

FIG. 3 illustrates an example of a logical architecture 300 for an enterprise network (e.g., the enterprise network 200). One of ordinary skill in the art will understand that, for the logical architecture 300 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 300 includes a management layer 302, a controller layer 320, a network layer 330 (such as embodied by the network fabric 220), a physical layer 340 (such as embodied by the various elements of FIG. 2), and a shared services layer 350.

The management layer 302 can abstract the complexities and dependencies of other layers and provide a user with tools and workflows to manage an enterprise network (e.g., the enterprise network 200). The management layer 302 can include a user interface 304, design functions 306, policy functions 308, provisioning functions 310, assurance functions 312, platform functions 314, and base automation functions 316. The user interface 304 can provide a user a single point to manage and automate the network. The user interface 304 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 304 may also provide visibility information, such as views of a network, network infrastructure, computing devices, and things. For example, the user interface 304 can provide a view of the status or conditions of the network, the operations taking place, services, performance, a topology or layout, protocols implemented, running processes, errors, notifications, alerts, network structure, ongoing communications, data analysis, and so forth.

The design functions 306 can include tools and workflows for managing site profiles, maps and floor plans, network settings, and IP address management, among others. The policy functions 308 can include tools and workflows for defining and managing network policies. The provisioning functions 310 can include tools and workflows for deploying the network. The assurance functions 312 can use machine learning and analytics to provide end-to-end visibility of the network by learning from the network infrastructure, endpoints, and other contextual sources of information. The platform functions 314 can include tools and workflows for integrating the network management system with other technologies. The base automation functions 316 can include tools and workflows to support the policy functions 308, the provisioning functions 310, the assurance functions 312, and the platform functions 314.

In some embodiments, the design functions 306, the policy functions 308, the provisioning functions 310, the assurance functions 312, the platform functions 314, and the base automation functions 316 can be implemented as microservices in which respective software functions are implemented in multiple containers communicating with each rather than amalgamating all tools and workflows into a single software binary. Each of the design functions 306, policy functions 308, provisioning functions 310, assurance functions 312, and platform functions 314 can be viewed as a set of related automation microservices to cover the design, policy authoring, provisioning, assurance, and cross-platform integration phases of the network lifecycle. The base automation functions 314 can support the top-level functions by allowing users to perform certain network-wide tasks.

The controller layer 320 can comprise subsystems for the management layer 302 and may include a network control platform 322, a network data platform 324, and AAA services 326. These controller subsystems can form an abstraction layer to hide the complexities and dependencies of managing many network elements and protocols.

The network control platform 322 can provide automation and orchestration services for the network layer 330 and the physical layer 340, and can include the settings, protocols, and tables to automate management of the network and physical layers. For example, the network control platform 330 can provide the design functions 306 and the provisioning functions 310. In addition, the network control platform 330 can include tools and workflows for discovering switches, routers, wireless controllers, and other network infrastructure devices (e.g., a network discovery tool); maintaining network and endpoint details, configurations, and software versions (e.g., an inventory management tool); Plug-and-Play (PnP) for automating deployment of network infrastructure (e.g., a network PnP tool), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 322 can communicate with network elements using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 322.

The network data platform 324 can provide for network data collection, analytics, and assurance, and may include the settings, protocols, and tables to monitor and analyze network infrastructure and endpoints connected to the network. The network data platform 324 can collect multiple types of information from network infrastructure devices, including syslog, SNMP, NetFlow, Switched Port Analyzer (SPAN), and streaming telemetry, among others.

In some embodiments, one or more Cisco DNA™ Center appliances can provide the functionalities of the management/provisioning layer 310, the network control platform 322, and the network data platform 324. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 326 can provide identity and policy services for the network layer 330 and physical layer 340, and may include the settings, protocols, and tables to support endpoint identification and policy enforcement services. The AAA services 326 can provide tools and workflows to manage virtual networks and security groups, and to create group-based policies and contracts. The AAA services 326 can identify and profile network infrastructure devices and endpoints using AAA/RADIUS, 802.1X, MAC Authentication Bypass (MAB), web authentication, and EasyConnect, among others. The AAA services 326 can also collect and use contextual information from the network control platform 322, the network data platform 324, and the shared services 350, among others. In some embodiments, Cisco® ISE can provide the AAA services 326.

The network layer 330 can be conceptualized as a composition of two layers, an underlay 334 comprising physical and virtual network infrastructure (e.g., routers, switches, WLCs, etc.) and a Layer 3 routing protocol for forwarding traffic, and an overlay 332 comprising a virtual topology for logically connecting wired and wireless users, devices, and things and applying services and policies to these entities. Network elements of the underlay 334 can establish connectivity between each other, such as via Internet Protocol (IP). The underlay may use any topology and routing protocol.

In some embodiments, the network controller 204 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 332 can be a logical, virtualized topology built on top of the physical underlay 334, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 220, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and SGT fields in packet headers. The network fabric 220 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 220 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 220. It can be used as source and destination classifiers in Scalable Group ACLs (SGACLs). The SGT can be used to provide address-agnostic group-based policies.

In some embodiments, the fabric control plane node 210 may implement the Locator/Identifier Separation Protocol (LISP) to communicate with one another and with the management cloud 202. Thus, the control plane nodes may operate a host tracking database, a map server, and a map resolver. The host tracking database can track the endpoints 230 connected to the network fabric 220 and associate the endpoints to the fabric edge nodes 226, thereby decoupling an endpoint's identifier (e.g., IP or MAC address) from its location (e.g., closest router) in the network.

The physical layer 340 can comprise network infrastructure devices, such as switches and routers 210, 222, 224, and 226 and wireless elements 208 and 228 and network appliances, such as the network controller appliance(s) 204, and the AAA appliance(s) 206.

The shared services layer 350 can provide an interface to external network services, such as cloud services 352; Domain Name System (DNS), DHCP, IP Address Management (IPAM), and other network address management services 354; firewall services 356; Network as a Sensor (Naas)/Encrypted Threat Analytics (ETA) services; and Virtual Network Functions (VNFs) 360; among others. The management layer 302 and/or the controller layer 320 can share identity, policy, forwarding information, and so forth via the shared services layer 350 using APIs.

Figure 4:
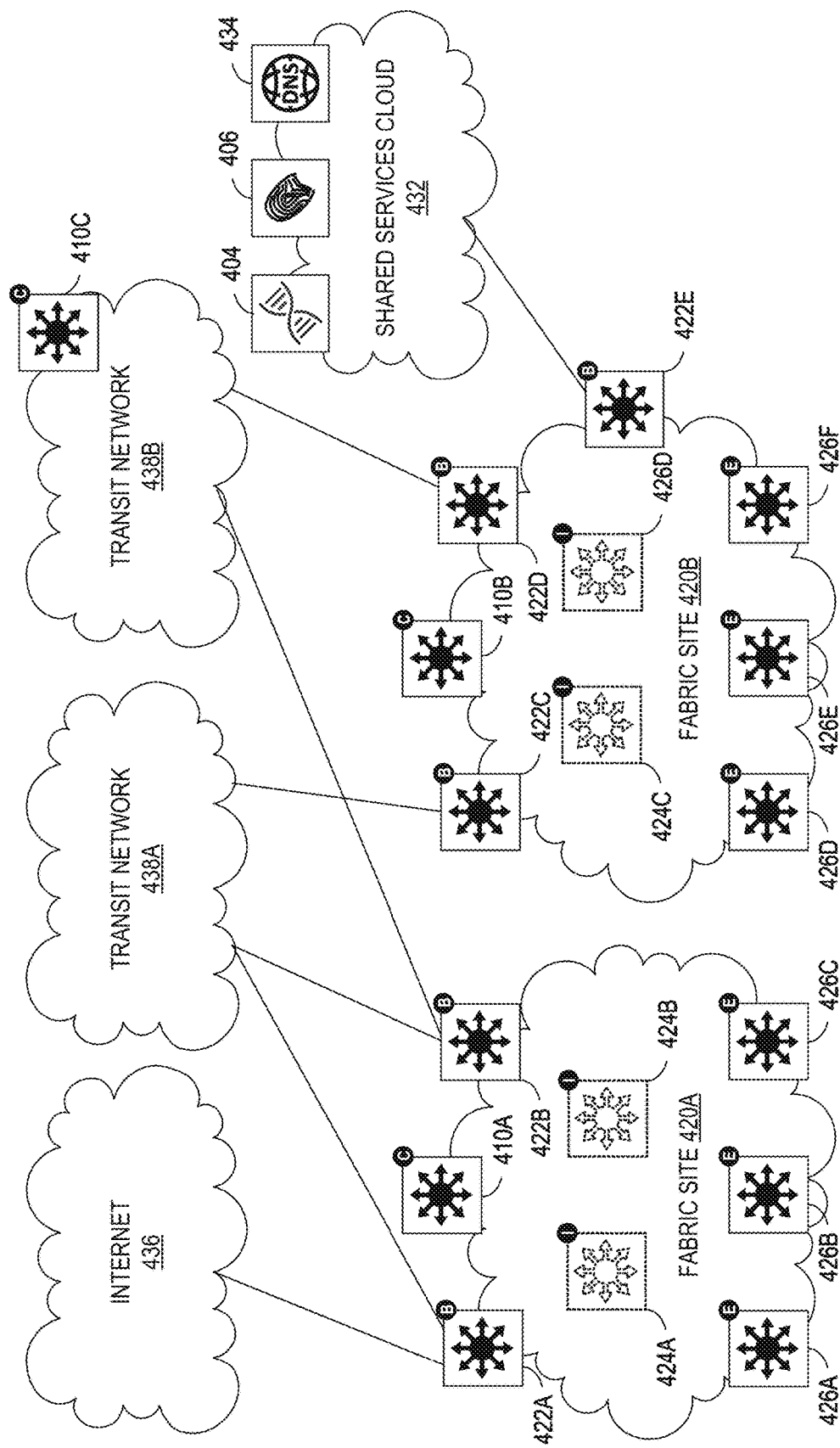
FIG. 4 illustrates an example of a physical topology for a multi-site enterprise network.
Figure 5:
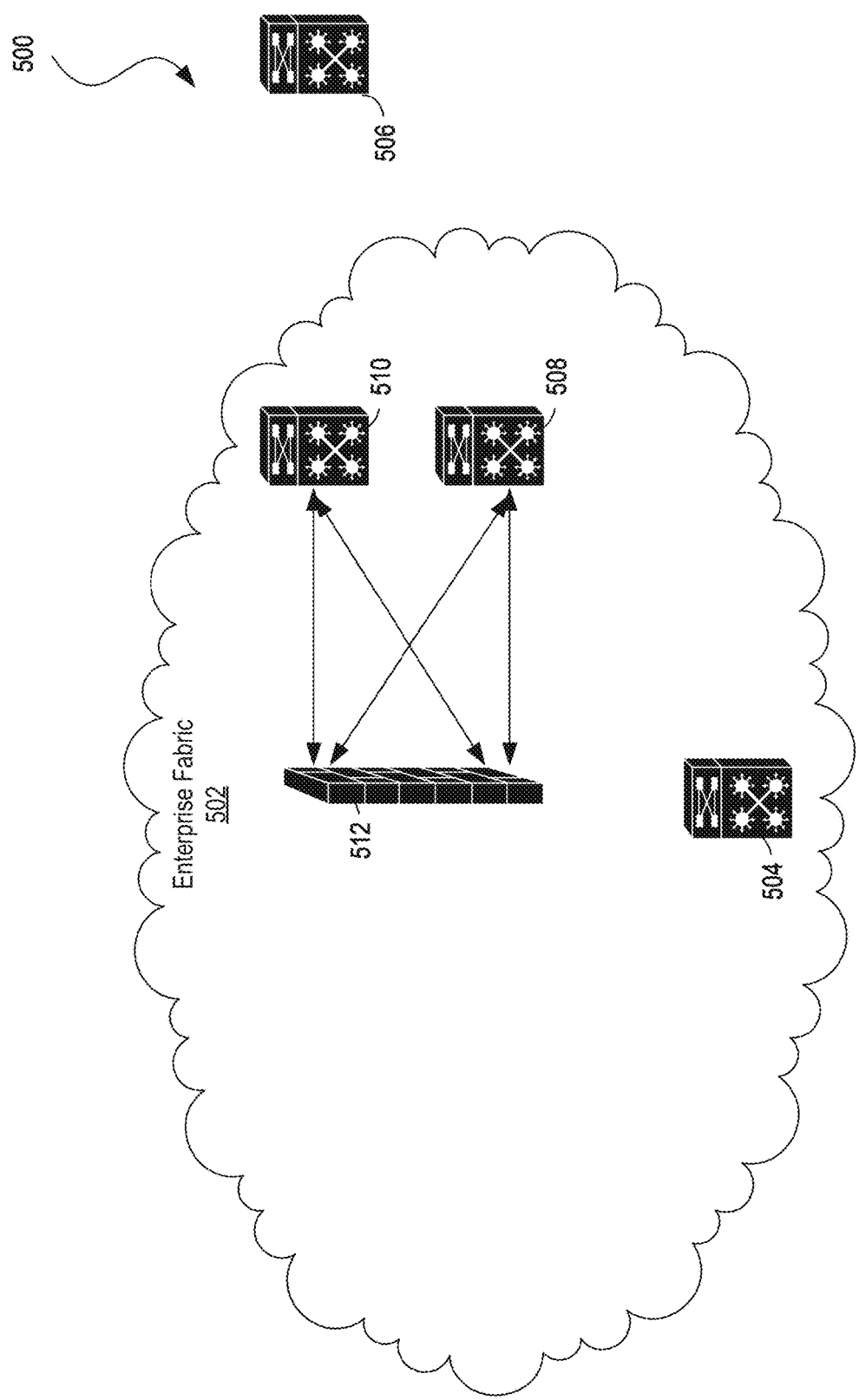
FIG. 5 shows an example network environment for supporting cross node communication through a firewall.

FIG. 4 illustrates an example of a physical topology for a multi-site enterprise network 400. In this example, the network fabric comprises fabric sites 420A and 420B. The fabric site 420A can include a fabric control node 410A, fabric border nodes 422A and 422B, fabric intermediate nodes 424A and 424B (shown here in dashed line and not connected to the fabric border nodes or the fabric edge nodes for simplicity), and fabric edge nodes 426A-D. The fabric site 420B can include a fabric control node 410B, fabric border nodes 422C-E, fabric intermediate nodes 424C and 424D, and fabric edge nodes 426D-F. Multiple fabric sites corresponding to a single fabric, such as the network fabric of FIG. 4, can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 436, traditional WAN 438A, Software-Defined WAN (SD-WAN) (not shown), or Software-Defined Access (SD-Access) 438B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network should be cable of carrying endpoint context information (e.g., VRF, SGT) across the network. Otherwise, a re-classification of the traffic may be needed at the destination site border.

The local control plane in a fabric site may only hold state relevant to endpoints that are connected to edge nodes within the local fabric site. The local control plane can register local endpoints via local edge nodes, as with a single fabric site (e.g., the network fabric 120). An endpoint that isn't explicitly registered with the local control plane may be assumed to be reachable via border nodes connected to the transit network. In some embodiments, the local control plane may not hold state for endpoints attached to other fabric sites such that the border nodes do not register information from the transit network. In this manner, the local control plane can be independent of other fabric sites, thus enhancing overall scalability of the network.

The control plane in the transit network can hold summary state for all fabric sites that it interconnects. This information can be registered to the transit control plane by border from different fabric sites. The border nodes can register EID information from the local fabric site into the transit network control plane for summary EIDs only and thus further improve scalability.

The multi-site enterprise network 400 can also include a shared services cloud 432. The shared services cloud 432 can comprise one or more network controller appliances 404, one or more AAA appliances 406, and other shared servers (e.g., DNS; DHCP; IPAM; SNMP and other monitoring tools; NetFlow, syslog, and other data collectors, etc.) may reside. These shared services can generally reside outside of the network fabric and in a global routing table (GRT) of an existing network. In this case, some method of inter-VRF routing may be required. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS_PATH attribute). Other routing protocols can also be used but may require complex distribute-lists and prefix-lists to prevent loops.

However, there can be several disadvantages in using a fusion router to achieve inter-VN communication, such as route duplication because routes leaked from one VRF to another are programmed in hardware tables and can result in more TCAM utilization, manual configuration at multiple touch points wherever route-leaking is implemented, loss of SGT context because SGTs may not be maintained across VRFs and must be re-classified once the traffic enters the other VRF, and traffic hairpinning because traffic may need to be routed to the fusion router, and then back to the fabric border node.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane node(s) (e.g., software), and avoids hairpinning because inter-VN forwarding can occur at the fabric edge (e.g., the same intra-VN) so traffic does not need to hairpin at the border node. Another advantage is that a separate VN can be made for each of the common resources that are needed (e.g., a Shared Services VN, an Internet VN, a data center VN, etc.).

As discussed previously, enterprise network fabrics allow cross-node, e.g. VN, communication between VRFs and VNs while keeping secured policy based isolation between the VRFs/VNs. In many deployments these cross-VRF communications pass through a firewall or other applicable service insertion application. Further, current enterprise fabrics use contexts associated with source VNs and destination VNs, e.g. security group tags (SGTs) to enforce policy. However, firewalls typically strip data packets of source host contexts making it difficult to enforce policies in enterprise network fabrics using the source host contexts. This becomes even more difficult when network environments are connected to an enterprise network fabric, e.g. in a multi-site enterprise network fabric, through dual homed borders with redundancy/load balancing.

The present includes systems, methods, and computer-readable media for solving these problems/discrepancies. Specifically, the present technology involves system, methods, and computer-readable media for preserving a source host context of traffic when a firewall security policy is applied to the traffic in an enterprise network fabric. Additionally, the present technology involves systems, methods, and computer-readable media for preserving a source context in traffic between two authorized subscribers in different VNs through an enterprise network fabric when firewall security policies are applied to the traffic.

FIG. 5 shows an example network environment 500 for supporting cross node communication through a firewall. In particular, the network environment 400 can support cross VN communication through a firewall. The example network environment 500 can be implemented through one or more applicable networks, such as the architectures 100 and 150 shown in FIGS. 1A and 1B, the enterprise network 200 shown in FIG. 2, and the multi-site enterprise network 400 shown in FIG. 4.

The network environment 500 includes an enterprise fabric 502. The enterprise fabric 502 includes a source host 504. The source host 504 can be an applicable edge node in the enterprise fabric 502. Specifically, the source host 504 can be a VN or a VRF at an edge of the enterprise fabric 502 that provides network service access through the enterprise fabric 502. The source host 504, as will be discussed throughout this paper, can be associated with a subscriber. A subscriber can include an applicable entity, e.g. a company, that accesses network services through the network environment 500.

The source host 504 can send network traffic through the enterprise fabric 502 to a destination host 506. Similarly, the destination host 506 can act as a source host and send network traffic to the source host 504 acting as a destination host through the enterprise fabric 502. The destination host 506 can be implemented within the enterprise fabric 502. For example, the destination host 506 can be another VN or VRF in the enterprise fabric 502. In another example, the source host 504 and the destination host 506 can be integrated at different sites within the enterprise fabric 502 when the enterprise fabric 502 is formed as a multi-site enterprise fabric. Further, the destination host 506 can be implemented outside of the enterprise fabric 502. For example, the destination host 506 can be implemented in the Internet separate from the enterprise fabric 502, in a cloud environment, in a WAN branch, and/or in a datacenter WAN.

The enterprise fabric 502 includes a first border node instance 508 and a second border node instance 510. A border node, as used herein, can include a network node, e.g. a VN, in the enterprise fabric 502 through which traffic is routed in the enterprise fabric 502. Specifically, a border node can be a network node that routes traffic into and out of the enterprise fabric 502. Further, a board node can be a network node that routes traffic between a source and a destination that are both within the enterprise fabric 502. The first border node instance 508 and the second border node instance 510 can be instances of the same border node. For example, the first border node instance 508 and the second border node instance 510 can be instances of the same border node occurring at different times. Further, the first border node instance 508 and the second border node instance 510 can be instances of different border nodes.

When implemented at two separate border nodes, the first border node instance 508 and the second border node instance 510 can form a dual homed border. Specifically, traffic that is transmitted through the enterprise fabric 502 can pass through both the first border node instance 508 and the second border node instance 510. For example, traffic that is transmitted out of the enterprise fabric 502 to an outside destination can pass through the first border node instance 508 and then the second border node instance 508 as part of transmitting the traffic to the outside destination. In another example, traffic that is transmitted from an outside source into the enterprise fabric 502 can be received by the second border node instance 510 and then be transmitted to the first border node instance 508 as part of transmitting the traffic through the enterprise fabric 502.

Additionally, the enterprise fabric 502 includes a firewall 512. The firewall 512 can receive traffic and apply one or more firewall security policies to the traffic flowing through the enterprise fabric 502. In particular, the firewall 512 can apply a firewall security policy to network traffic received at the first border node instance 508 and the second border node instance 510. For example, the first border node instance 508 can receive traffic from the source host 504 as part of transmitting the traffic to the destination host 506. The first border node instance 508 can transmit the received traffic to the firewall 512, where the firewall can apply a firewall security policy to the network traffic. The firewall 512 can then transmit the traffic to the second border node instance 510, e.g. if the firewall security policy permits transmission of traffic from the source host 504 to the destination host 506. Subsequently, the second border node instance 510 can transmit the traffic to the destination host 506.

The firewall 512 can remove source context information from traffic. Specifically, the firewall 512 can remove source context information from traffic originating from the source host 504 as part of applying one or more firewalls to the traffic. Source context information can include applicable information describing a source of network traffic. For example, source context information can include a SGT of a source of network traffic. In removing source context information from the traffic originating from the source host 504, the firewall 512 can strip source context information from data packets in the traffic to apply a firewall policy. Specifically, the firewall 512 can apply a firewall policy using source/destination prefixes and VRF classification of a packet and strip off source context information, e.g. an SGT, as part of applying the firewall policy to the packet. While reference is made throughout this paper to a firewall removing source context information, the techniques and systems described herein can be implemented for an applicable service that removes source context information from traffic passing through the enterprise fabric 502.

FIGS. 6A and 6B show an example timing diagram for an example method of preserving source context information in traffic passing through an enterprise network when a firewall is applied to the traffic. In preserving source context information, one or more policies can be applied to traffic based on the source context information to control transmission of the traffic through an enterprise network. For example, traffic between two different VNs of two subscribers can be controlled through an enterprise network, e.g. through a multi-homed border of the enterprise network, by preserving source context information of the traffic.

In the example timing diagram, reference is made to DNAC. DNAC represents an applicable controller for controlling traffic through an enterprise network, such as a Cisco® DNA center. The timing diagram also references ISE. ISE represents an applicable network administration system for controlling policy creation and enforcement, such as a Cisco® Identity Services Engine. In the example timing diagram, MSMR represents an applicable map server/map resolver for controlling traffic in a network environment, such as a LISP map server. The Border(IID1) represents a first instance of a border node, hereafter referred to as "first border node instance." The Border(IID2) represents a second instance of a border node, hereafter referred to as "second border node instance." H1(EID1) represents a source host and H2(EID2) represent a destination source. In various embodiments the destination host can act as a source host and transmit traffic to the source host acting as a destination host. xTR1(IID1) and xTR2(IID2) represent switches/routers in corresponding VRFs, herein referred to as the corresponding "first VRF" and "second VRF." The first VRF, e.g. corresponding switch/router, is logically implemented between the source host and the first border node instance and the second VRF, e.g. corresponding switch.router, is logically implemented between the destination host and the second border node instance.

At step 602 in the example timing diagram, DNAC requests, from ISE, bindings of source context information to network addresses of specific nodes associated with the source context information. Specifically, DNAC can request bindings of SGTs of security groups to IP addresses of nodes included in the specific security groups. Subsequently, ISE, at step 604, can provide the bindings of source context information to network addresses back to DNAC.

At step 606 in the example timing diagram, DNAC configures a policy, e.g. an inter-VRF policy, on MSMR to facilitate cross-VRF segmentation based on source and destination context information. DNAC can configure a policy on MSMR through LISP to allow cross-VRF SGT/DGT based segmentation within source and destination VRFs/VNs. Specifically, MSMR can use LISP to build multiple-perspective cross VRF policy tables/mappings, e.g. as part of the inter-VRF policy, that include sources and destinations associated with specific VRFs. Further, the VRF policy tables can include contexts, e.g. SGTs, associated with sources and destinations, effectively creating VN subnets and a group based policy per source context.

As will be discussed in greater detail later, the inter-VRF policy can be dynamically learned, thereby leading to dynamic SGT learning, through map-register messages, e.g. map-register LIST messages. The 'sgt-any' command can be used as part of dynamically learning the policy, including source contexts, through LISP. The policy can be maintained at MSMR as part of a mapping of contexts associated with traffic sources to identifications of the traffic sources. For example, MSMR can maintain mappings of SGTs of security groups to network identifiers of nodes, e.g. IP addresses of the nodes, included in the security groups. As will be discussed in greater detail later, the mappings of contexts associated with source hosts to identifications of the sources hosts can be used to facilitate context preservation in network traffic when a firewall is applied to the traffic.

In the timing diagram, at step 608, the firewall injects routes into the first border node instance. The routes can include information associated with sources and destinations of traffic through an enterprise fabric. Specifically, the routes can include prefixes of VNs/VRFs that receive traffic through the enterprise fabric. For example, the firewall, at step 608, can inject routes of the second VRF, e.g. associated with a second VRF prefix IID2, into the first border node instance. A VRF prefix, as used herein, can include a prefix that identifies a specific VRF and a specific source context of one or more source hosts associated with the specific VRF. For example, the second VRF prefix IID2 can uniquely identify nodes in a security group, and having a corresponding security group tag, that are associated with the second VRF. The first border node instance, as will be discussed in greater detail later, can use the injected routes to forward traffic to the firewall before sending it to a destination. For example and as will be discussed in greater detail later, the first border node instance can receive traffic from the first VRF that is destined for a node associated with the second VRF. As follows, the first border node instance can forward the traffic to the firewall based on the injected routes including the second VRF prefix IID32.

At step 610, MSMR publishes, to the second border node instance, an incomplete map cache of nodes in one or more network environments, e.g. nodes associated with the first border node instance. Specifically, MSMR can publish an incomplete map cache for nodes associated with the first VRF prefix IID1. A map cache can include LISP mappings of hosts, e.g. sources and destinations, to a switch/router that egress and ingress traffic passes through in passing to and from the sources and destinations. Specifically, a LISP mapping can include a mapping of sources and destinations to switches and routers behind which the sources and destinations exist in a network environment. More specifically, a LISP mapping can include a mapping of sources and destinations to Routing Locators (RLOC) of the associated switches and routers, e.g. IPv4 or IPv6 addresses of the switches and routers.

An incomplete map cache can be incomplete by not including a mapping of a host, e.g. a destination host, to a switch/router behind which the host exists, e.g. logically, in a network environment. An incomplete map cache can be incomplete by not including an RLOC of a destination node in a specific VRF. Specifically, an incomplete map cache does not include a mapping of the source host H1(EID1) to an RLOC of the corresponding switch/router in the first VRF xTR1(IID1), e.g. the switch that egress and ingress traffic passes through in passing to and from the source host H1(EID1). Further, an incomplete map cache does not to include a mapping of the destination host H2(EID2) to an RLOC of the corresponding switch/router in the second VRF xTR2(IID2), e.g. the switch that egress and ingress traffic passes through in passing to and from the destination host H2(EID2). IID2. For example, MSMR can publish to the second border node instance at step 610, an incomplete map cache that does not include a mapping of the source host H1(EID1) to the corresponding switch/router in the first VRF xTR1(IID1).

At step 612, similar to step 608, the firewall injects routes into the second border node instance. The routes can include information associated with sources and destinations of traffic through an enterprise fabric. Specifically, the routes can include prefixes of VNs/VRFs that receive traffic through the enterprise fabric. For example, the firewall, at step 612, can inject routes of the first VRF, e.g. associated with a first VRF prefix IID1, into the second border node instance. The second border node instance, as will be discussed in greater detail later, can use the injected routes to forward traffic to the firewall before sending it to a destination. For example and as will be discussed in greater detail later, the second border node instance can receive traffic from the second VRF that is destined for a node associated with the first VRF. As follows, the second border node instance can forward the traffic to the firewall based on the injected routes including the first VRF prefix IID1.

At step 614, MSMR publishes, to the first border node instance, an incomplete map cache of nodes in one or more network environments, e.g. nodes associated with the second border node instance. Specifically, MSMR can publish an incomplete map cache for nodes associated with the second VRF prefix IID2. For example, MSMR can publish to the first border node instance an incomplete map cache that does not include a mapping, e.g. a LISP mapping, of the destination host H2(EID2) to a corresponding switch/router in the second VRF xTR2(IID2) that the destination host H2(EID2) is implemented behind in the second VRF.

At step 616, the source host H1(EID1) begins communicating with the first VRF. Specifically, the source host can send an address resolution protocol (ARP)/DHCP request to the first VRF. Accordingly, the first VRF can recognize the source host based on the source host communicating with the first VRF. At step 618, the first VRF sends a map-register message to MSMR. The map-register message can identify the source host as being associated with the first VRF. Specifically, the map-register message can include a mapping, e.g. LISP mapping, of the source host to the corresponding switch/router in the first VRF xTR1(IID1). The map-register message can also include a context associated with the source host, e.g. an SGT of the host or an endpoint acting as either a source or a destination. MSMR can use the map-register message to dynamically learn the destination endpoint by mapping the source host to the first VRF and/or the context associated with the source host. Specifically, MSMR can add the source host and the association of the source host with the first VRF and/or the context associated with the first host to the inter-VRF policy configured at step 606. More specifically, if the map-register message includes a context associated with the source host, then MSMR can use the map-register message to dynamically learn the source host context by mapping the source host context to the source host. As will be discussed in greater detail later, the mapping of the source host to the first VRF and/or the context associated with the source host can be used to maintain the context associated with the source host.

At step 620, the destination host H2(EID2) begins communicating with the second VRF. Specifically, the destination host can send an address resolution protocol (ARP)/DHCP request to the second VRF. Accordingly, the second VRF can recognize the destination host based on the destination host communicating with the second VRF. At step 622, the second VRF sends a map-register message to MSMR. The map-register message can identify the destination host as being associated with the second VRF. Specifically, the map-register message can include a mapping, e.g. LISP mapping, of the destination host to the corresponding switch/router in the second VRF xTR2(IID2). The map-register message can also include a context associated with the destination host, e.g. an SGT of the destination host. MSMR can use the map-register message to dynamically learn the destination host by mapping the destination host to the second VRF and/or the context associated with the destination host. Specifically, MSMR can add the destination host and the association of the destination host with the second VRF and/or the context associated with the destination host to the inter-VRF policy configured at step 606. More specifically, if the map-register message includes a context associated with the destination host, then MSMR can use the map-register message to dynamically learn the destination host context by mapping the destination host context to the destination host As will be discussed in greater detail later, the mapping of the destination host to the second VRF and/or the context associated with the destination host, can be used to maintain the context associated with the destination host.

Next, at step 624, the first VRF receives traffic from the source host H1(EID1) that is destined for the destination host H2(EID2). The traffic can comprise one or more data packets that include an identification of the destination host as a destination for the packets and an identification of the source host as the source of the data packets. The one or more data packets can also include a VRF prefix associated with the source host, e.g. the first VRF prefix IID1. Further, the data packets received from the source host at the first VRF can include unicast data packets.

At step 626, the first VRF sends a map request for the destination host H2(EID2) to MSMR. The first VRF can generate the map request based on information included in the traffic, as received from the source host. Specifically, the map request can include an identification of the source host as the source of the traffic. The map request can also include both the VRF prefix included in the received traffic and an identification of the destination host as a destination of the traffic. For example, the map request can include the identification of the destination host H2 in the first VRF prefix IID1.

In turn, at step 628, MSMR can send a map reply back to the first VRF in response to the map request. The map reply can include an identification of a border node associated with the source host and a context associated with the source host. For example, the map reply can include an identification of the first border node (IID1) that is associated with the source host and the SGT associated with the source host, SGT1. Specifically, MSMR can use a mapping of hosts to associated nodes in a VRF, e.g. to corresponding RLOCs in a VRF, as included as part of the inter-VRF policy, to identify the first border node and the context associated with the source host, SGT1. As follows, MSMR can include the identification of the first border node and the context associated with the source host, SGT1, as part of the map reply.

The source host and the destination host can be associated with different subscribers. As will be discussed in greater detail later, the traffic can be tagged with the context associated with the source host, SGT1, to allow subscriber to subscriber secured communication between the source host and the destination host. In order to control subscriber to subscriber communication, MSMR can be configured to enforce one or more policies for controlling the subscriber to subscriber communication. Specifically, the inter-VRF policy can be extended to allow provisioning of user intent to allow communication between the source host and the destination host as a service insertion between the first VRF and the second VRF. This can be accomplished by creating appropriate policy lookup tables for different subscriber to subscriber communications.

Accordingly, when the MSMR receives a map request generated by the fabric edge to communicate to a different subscriber the policy table is accessed to see if this cross-subscriber communication is allowed. If the cross-subscriber communication is allowed, then MSMR can return a map reply that is used to create forwarding entry in the ingress FE. Alternatively, if the cross-subscriber communication is not allowed, then MSMR can refrain from returning the map reply and the applicable information included therein, e.g. SGT1 of the source host. With reference to the timing diagram shown in FIGS. 6A and 6B, MSMR can use the map request received from the first VRF at step 626 to determine whether communication between the source host and the destination host is allowed. As follows, MSMR can determine that communication between the source host and the destination host is allowed and provide the map reply at step 628.

The first VRF can then send the traffic, at step 630, to the first border node instance. Specifically, the first VRF can send the traffic to the first border node instance, based on the identification of the first border node instance in the map reply sent at step 628. In sending the traffic to the first border node instance, the first VRF can encapsulate the traffic with the first VRF prefix IID1 and SGT1 associated with the source host.

At step 632, the first border node instance can send the encapsulated packet to the firewall. Specifically, the first border node instance can send the encapsulated packet to the firewall in response to the routes injected into the first border node instance by the firewall at step 608. The firewall can then apply one or more firewall policies to the encapsulated packet. In applying the firewall policies, the firewall can actually strip the packet of the context associated with the source host, e.g. SGT1 of the source host, that is included as part of the encapsulated packet. After applying the one or more firewall policies, the firewall, at step 634, can transmit the packet to the second border node instance. Specifically, the firewall can transmit the packet to the second border node instance as part of transmitting the packet based on the second VRF prefix IID2 and the identification of the destination host as the destination for the packet.

At step 636, the second border node instance sends a map request for the destination host H2(EID2) in VRF prefix IID2 to MSMR. The map request can include an identification of the source host as the source of the traffic. The map request can also include both the VRF prefix included in the received traffic and an identification of the destination host as a destination of the traffic. For example, the map request can include the identification of the destination host H2 in the second VRF prefix IID2. The second border node instance can generate the map request based on information included in the packet, as received from the firewall. Specifically, the second border node instance can generate the map request even though the packet does not include the context associated with the source host, e.g. SGT1.

The second border node instance can send the map request at step 636 based on an incomplete map cache at the second border node instance. Specifically, the map cache at the second border node instance can lack a pairing of the destination host H2(EID2) to the corresponding switch/router in the second VRF xTR2(IID2). More specifically, the map cache at the second border node instance can lack a pairing of the destination host to an RLOC of the corresponding switch/router in the second VRF. Accordingly, the second border node instance can generate and send the map request for the destination host in VRF prefix IID2 based on the incomplete map cache. Further, the second border node instance can send the map request at step 636 in response to the firewall decapsulating the packet and sending the decapsulated packet to the second border node instance.

In turn, at step 638, MSMR sends a map reply back to the second border node instance in response to the map request sent at step 636. The map reply can include an identification of a VRF associated with the destination host and the corresponding switch/router in the second VRF xTR2(IID2) based on the second VRF prefix IID2. For example, the map reply can include the RLOC of the corresponding switch/router in the second VRF xTR2(IID2). The map reply can also include a context associated with the source host, e.g. SGT1. Similar to step 628, MSMR can use a mapping of hosts to associated nodes in a VRF, e.g. to corresponding RLOCs in a VRF, as included as part of the inter-VRF policy, to identify the switch in the second VRF and the context associated with the source host, e.g. SGT1. As follows, the MSMR can include the identification of the switch in the second VRF and SGT1 as part of the map reply.

As discussed previously with respect to step 628, MSMR can selectively send the map reply to the second border node instance. Specifically, MSMR can selectively determine whether to send the map reply to the second border node instance according to one or more policies for the enterprise network. More specifically, when the source host and the destination host are associated with different subscribers, MSMR can selectively determine whether to send the map reply to the second border node instance to control subscriber to subscriber communications through the enterprise network. For example, if a subscriber to subscriber policy does not allow communication between the source host and the destination host, then MSMR can refrain from providing the map reply back to the second border node instance. By selectively sending the map reply to the second border node instance, MSMR can effectively control encapsulation of the packet with the source host context, SGT1.

At step 640, the second border node instance can selectively encapsulate the packet with both the second VRF prefix IID2 and the source host context, SGT1. By encapsulating the packet with the source host context after it is removed by the firewall, the second border node instance, in combination with MSMR, can effectively preserve the source host context. Specifically, the second border node instance, in combination with MSMR, can preserve the source host context after the firewall strips the packet of the source host context through application of the one or more firewalls.

The second border node instance can determine whether to actually encapsulate the data packet with the source host context based on one or more policies, thereby selectively encapsulating the data packet based on the one or more policies. As a result, the second border node can effectively enforce the policies. For example, if a subscriber to subscriber communication policy does not allow communication between a subscriber associated with the source host and a subscriber associated with the destination host, then the second border node instance can refrain from encapsulating the data packet and subsequently sending the data packet. Further in the example, if the policy does allows communication between the subscriber associated with the source host and the subscriber associated with the destination host, then the second border node instance can encapsulate the data packet and subsequently transmit the data packet to the second VRF.

At step 642, the second VRF receives the encapsulated packet from the second border node instance and subsequently decapsulates the packet. In turn, the second VRF can send the descapsulated packet to the destination host.

Similar techniques for preserving source host context can be applied to traffic in the reverse direction, as depicted after step 644. Specifically, the destination host H2(EIID2) can act as a source host of traffic and the source host H1(EIID1) can act as the destination host of the traffic. For continuity purposes the destination host is still referred to as the destination host, even though the destination host is actually acting as a source host. Similarly, for continuity purposes the source host is still referred to as the source host, even the source is actually acting as a destination host.

At step 646, the destination host H2(EIID2) sends a data packet to the second VRF. The data packet can include an identification of the destination host as the source, an identification of the source host H1(EIID1) as the destination, and a VRF prefix of the second VRF, IID2, associated with the destination host. At step 648, the second VRF can send a map request to MSMR for the source host H1 in the second VRF prefix IID2. The map request can also include a context associated with the destination host acting as a source host, SGT2.

At step 650, MSMR sends a map reply back to the second VRF. The map reply can identify the second border node instance for sending the data packet to the source host H1. At step 652, the second VRF encapsulates the data packet with the second VRF prefix IID2 and SGT2. Subsequently, the second VRF can send the encapsulated packet to the second border node instance.

At step 654, the second border node instance sends the data packet to the firewall, where the firewall can apply one or more firewall policies. As discussed previously with respect to the first border node instance, the second border node instance can send the packet to the firewall based on the routes injected into the second border node instance at step 612. In applying the firewall policies, the firewall can remove the context associated with the destination host acting as a source host, SGT2, from the packet. The firewall, at step 656, can route the packet to the first border node instance after applying the one or more firewall policies.

The first border node instance, at step 658, sends a map request for the source host H1(EID1) in VRF prefix IID1 to MSMR. The map request can include an identification of the destination host as the source of the traffic. The map request can also include both the VRF prefix included in the received traffic and an identification of the source host as a destination of the traffic. For example, the map request can include the identification of the source host H1 in the first VRF prefix IID1. As discussed previously with respect to the second border node instance at step 636, the first border node instance can send the map request in response to an incomplete map cache. Specifically, the map cache at the first border node instance can lack a pairing of the source host H1(EID1) to the corresponding switch/router in the first VRF xTR1(IID1) and the first border node instance can send the map request due to the presence of this incomplete map cache.

At step 660, MSMR sends a map reply back to the second border node instance. The map reply can include an identification of a VRF associated with the source host and the corresponding switch/router in the second VRF xTR1(IID1) based on the first VRF prefix IID1. For example, the map reply can include the RLOC of the corresponding switch/router in the first VRF xTR1(IID1). The map reply can also include a context associated with the destination host, e.g. SGT2. Similar to steps 628 and 638, MSMR can use a mapping of hosts to associated nodes in a VRF, e.g. to corresponding RLOCs in a VRF, as included as part of the inter-VRF policy, to identify the switch in the first VRF and the context associated with the destination host, e.g. SGT2. As follows, the MSMR can include the identification of the switch in the first VRF and SGT1 as part of the map reply.

As discussed previously with respect to steps 628 and 638, MSMR can selectively send the map reply to the first border node instance. Specifically, MSMR can selectively determine whether to send the map reply to the first border node instance according to one or more policies for the enterprise network. More specifically, when the source host and the destination host are associated with different subscribers, MSMR can selectively determine whether to send the map reply to the first border node instance to control subscriber to subscriber communications through the enterprise network. For example, if a subscriber to subscriber policy does not allow communication between the source host and the destination host, then MSMR can refrain from providing the map reply back to the first border node instance. By selectively sending the map reply to the first border node instance, MSMR can effectively control encapsulation of the packet with the destination host context, SGT2.

At step 662, the first border node instance can selectively encapsulate the packet with both the first VRF prefix IID1 and the destination host context, SGT2. By encapsulating the packet with the destination host context after it is removed by the firewall, the first border node instance, in combination with MSMR, can effectively preserve the context of the destination host acting as a source host. Specifically, the first border node instance, in combination with MSMR, can preserve SGT2 after the firewall strips the packet of SGT2 through application of the one or more firewalls.

As discussed previously with respect to the second border node instance at step 640, the first border node instance can determine whether to actually encapsulate the data packet with the destination host H2(EIID2) context based on one or more policies, thereby selectively encapsulating the data packet based on the one or more policies. As a result, the second border node can effectively enforce the policies. After encapsulating the data packet, the first border node instance can send the packet to the first VRF.

At step 664, the first VRF receives the encapsulated packet from the first border node instance and subsequently decapsulates the packet. In turn, the first VRF can send the descapsulated packet to the source host H1(EIID1).

The disclosure now turns to FIGS. 7 and 8, which illustrate example network devices and computing devices, such as switches, routers, load balancers, client devices, and so forth.

FIG. 7 illustrates a computing system architecture 700 wherein the components of the system are in electrical communication with each other using a connection 705, such as a bus. Exemplary system 700 includes a processing unit (CPU or processor) 710 and a system connection 705 that couples various system components including the system memory 715, such as read only memory (ROM) 720 and random access memory (RAM) 725, to the processor 710. The system 700 can include a cache 712 of high-speed memory connected directly with, in close proximity to, or integrated as part of the processor 710. The system 700 can copy data from the memory 715 and/or the storage device 730 to the cache 712 for quick access by the processor 710. In this way, the cache 712 can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 640 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

FIG. 8 illustrates an example network device 800 suitable for performing switching, routing, load balancing, and other networking operations. Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 804 to efficiently perform routing computations, network diagnostics, security functions, etc.

Although the system shown in FIG. 8 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   receiving a data packet as part of network traffic to a destination host from a source host at a first border node instance in an enterprise network fabric, wherein the data packet is received with a context associated with the source host;
   sending the data packet to a firewall of the enterprise network fabric wherein the firewall strips the context associated with the source host from the data packet and applies a firewall policy to the data packet;
   receiving the data packet at a second border node instance after the firewall applies the firewall policy to the data packet; and
   selectively encapsulating the data packet with the context associated with the source host at the second border node instance based on one or more policies for controlling transmission of the network traffic through the enterprise network fabric and in response to the firewall stripping the context associated with the source host from the data packet.

2. The method of claim 1, wherein the context associated with the source host includes a security group tag associated with the source host.

3. The method of claim 1, wherein either or both the source host and the destination host are in the enterprise network fabric.

4. The method of claim 1, wherein only one of the source host and the destination host are in the enterprise network fabric.

5. The method of claim 1, wherein the first border node instance and the second border node instance are two separate instances of a same border node.

6. The method of claim 1, wherein the first border node instance and the second border node instance are instances of two different border nodes as part of a multi-homed border of the enterprise network fabric.

7. The method of claim 1, further comprising:
   receiving, from a map register, and maintaining, at a map server/map resolver (MSMR), a mapping of contexts associated with sources to identifications of sources including the context associated with the source host mapped to an identification of the source host;
   sending, from the second border node instance to the MSMR, a map request including an identification of the source host; and
   receiving, at the second border node from the MSMR, the context associated with the source host, wherein the context associated with the source host is determined at the MSMR using the mapping based on the identification of the source host received from the first border node instance.

8. The method of claim 7, wherein the second border node instance is configured to send the map request to the MSMR in response to the firewall decapsulating the data packet through application of the firewall policy.

9. The method of claim 7, further comprising:
   sending a map reply of at least a plurality of nodes associated with the second border node from the MSMR to the second border node instance, wherein the map reply excludes a mapping of the destination host to a corresponding RLOC; and
   sending the identification of the source host from the second border node instance to the MSMR as part of a map request based on the map cache excluding the mapping of the destination host to the RLOC.

10. The method of claim 1, further comprising:
    maintaining, at a map server/map resolver (MSMR), a mapping of contexts associated with sources to identifications of sources including the context associated with the source host mapped to an identification of the source host;
    sending, from the second border node instance to the MSMR, an identification of the source host;
    determining, at the MSMR, whether to send the context associated with the source host to the second border node instance based on the one or more policies; and
    selectively sending the context associated with the source host from the MSMR to the second border node instance based on whether it is determined to send the context based on the one or more policies to facilitate selective encapsulation of the data packet with the context associated with the source host.

11. The method of claim 10, wherein the MSMR determines whether to send the context associated with the source host using the mapping of contexts associated with sources to identifications of sources, the identification of the source host, and the one or more policies.

12. The method of claim 1, further comprising:
    determining whether to send the data packet after it is encapsulated with the context associated with the source host based on the one or more policies as part of applying the one or more policies to the network traffic; and
    sending the data packet encapsulated with the context associated with the source host to the destination host if it is determined to send the data packet based on the one or more policies.

13. The method of claim 1, wherein the source host is associated with a first subscriber and the destination host is associated with a second subscriber, the method further comprising:
    selectively encapsulating the data packet with the context associated with the source host for applying the one or more policies controlling subscriber to subscriber communication through the enterprise network fabric.

14. The method of claim 13, wherein the one or more policies allow communication between the first subscriber and the second subscriber, the method further comprising:
    receiving, at the second border node instance from a MSMR, the context associated with the source host based on the one or more policies allowing communication between the first subscriber and the second subscriber;
    encapsulating the data packet with the context associated with the source host; and
    sending the encapsulated data packet to the destination host from the second border node instance.

15. A system comprising:
one or more processors; and
at least one computer-readable storage medium having stored therein instructions which, when executed by the one or more processors, cause the one or more processors to perform operations comprising:
  receiving a data packet as part of network traffic to a destination host from a source host at a first border node instance in an enterprise network fabric, wherein the data packet is received with a security group tag associated with the source host;
  sending the data packet to a firewall of the enterprise network fabric wherein the firewall strips the context associated with the source host from the data packet and applies a firewall policy to the data packet;
  receiving the data packet at a second border node instance after the firewall applies the firewall policy to the data packet; and
  selectively encapsulating the data packet with the security group tag associated with the source host at the second border node instance based on one or more policies for controlling transmission of the network traffic through the enterprise network fabric and in response to the firewall stripping the context associated with the source host from the data packet.

16. The system of claim 15, wherein the instructions which, when executed by the one or more processors, further cause the one or more processors to perform operations comprising:
  maintaining, at a map server/map resolver (MSMR), a mapping of security group tags associated with sources to identifications of sources including the security group tag associated with the source host mapped to an identification of the source host;
  sending, from the second border node instance to the MSMR, an identification of the source host; and
  receiving, at the second border node from the MSMR, the security group tag associated with the source host, wherein the security group tag associated with the source host is determined at the MSMR using the mapping based on the identification of the source host received from the first border node instance.

17. The system of claim 16, wherein the second border node instance is configured to send the identification of the source host to the MSMR in response to the firewall decapsulating the data packet through application of the firewall policy.

18. The system of claim 15, wherein the instructions which, when executed by the one or more processors, further cause the one or more processors to perform operations comprising:
  receiving and maintaining, at the MSMR, a mapping of security group tags associated with sources to identifications of sources including the context associated with the source host mapped to an identification of the source host;
  sending, from the second border node instance to the MSMR, an identification of the source host;
  determining, at the MSMR, whether to send the security group tag associated with the source host to the second border node instance based on the one or more policies; and
  selectively sending the security group tag associated with the source host from the MSMR to the second border node instance based on whether it is determined to send the security group tag based on the one or more policies to facilitate selective encapsulation of the data packet with the security group tag associated with the source host.

19. The system of claim 15, wherein the source host is associated with a first subscriber and the destination host is associated with a second subscriber and the instructions which, when executed by the one or more processors, further cause the one or more processors to perform operations comprising:
  selectively encapsulating the data packet with the security group tag associated with the source host for applying the one or more policies controlling subscriber to subscriber communication through the enterprise network fabric.

20. A non-transitory computer-readable storage medium having stored therein instructions which, when executed by a processor, cause the processor to perform operations comprising:
  receiving a data packet as part of network traffic to a destination host from a source host at a first border node instance in an enterprise network fabric, wherein the data packet is received with a context associated with the source host;
  injecting, into the first border node instance, routes from source nodes associated with the first border node instance to a firewall of the enterprise network fabric;
  sending the data packet to the firewall based on the routes injected into the first border node instance wherein the firewall strips the context associated with the source host from the data packet and applies a firewall policy to the data packet;
  receiving the data packet at a second border node instance after the firewall applies the firewall policy to the data packet; and
  selectively encapsulating the data packet with the context associated with the source host at the second border node instance based on one or more policies for controlling transmission of the network traffic through the enterprise network fabric and in response to the firewall stripping the context associated with the source host from the data packet.

* * * * *